US008904186B2

(12) United States Patent
Smith et al.

(10) Patent No.: US 8,904,186 B2
(45) Date of Patent: Dec. 2, 2014

(54) MULTI-FACTOR AUTHENTICATION PROCESS

(71) Applicant: Intel Corporation, Santa Clara, CA (US)

(72) Inventors: Ned Smith, Hillsboro, OR (US); Victoria Moore, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/629,895

(22) Filed: Sep. 28, 2012

(65) Prior Publication Data

US 2014/0096212 A1  Apr. 3, 2014

(51) Int. Cl.
*G06F 21/00* (2013.01)
*G06F 21/34* (2013.01)

(52) U.S. Cl.
CPC ........ *G06F 21/34* (2013.01); *G06F 2221/2113* (2013.01)
USPC ....................................................... 713/185

(58) Field of Classification Search
CPC .......................... G06F 21/34; G06F 2221/2113
USPC ................................................ 726/7; 713/185
See application file for complete search history.

(56) References Cited

U.S. PATENT DOCUMENTS

| 7,373,515 | B2 * | 5/2008 | Owen et al. | 713/182 |
|---|---|---|---|---|
| 7,770,002 | B2 * | 8/2010 | Weber | 713/159 |
| 8,245,292 | B2 * | 8/2012 | Buer | 726/20 |
| 8,286,227 | B1 * | 10/2012 | Zheng | 726/6 |
| 2003/0163739 | A1 * | 8/2003 | Armington et al. | 713/202 |
| 2004/0187018 | A1 * | 9/2004 | Owen et al. | 713/200 |
| 2006/0184787 | A1 * | 8/2006 | Sandhu et al. | 713/155 |
| 2007/0022301 | A1 * | 1/2007 | Nicholson et al. | 713/184 |
| 2007/0118745 | A1 * | 5/2007 | Buer | 713/168 |
| 2007/0186106 | A1 * | 8/2007 | Ting et al. | 713/168 |
| 2008/0005035 | A1 * | 1/2008 | Schwartz et al. | 705/64 |
| 2008/0046723 | A1 * | 2/2008 | Weber | 713/159 |
| 2008/0052245 | A1 * | 2/2008 | Love | 705/76 |
| 2008/0115198 | A1 * | 5/2008 | Hsu et al. | 726/5 |
| 2009/0183246 | A1 * | 7/2009 | Kokologiannakis | 726/7 |
| 2010/0138666 | A1 * | 6/2010 | Adams et al. | 713/186 |
| 2010/0174913 | A1 * | 7/2010 | Johnson et al. | 713/186 |
| 2013/0074170 | A1 * | 3/2013 | Lo et al. | 726/7 |
| 2013/0208103 | A1 * | 8/2013 | Sands et al. | 348/78 |

OTHER PUBLICATIONS

Huang et al.; A Generic Framework for Three-Factor Authentication: Preserving Security and Privacy in Distributed Systems; Published in: Parallel and Distributed Systems, IEEE Transactions on (vol. 22 , Issue: 8) Biometrics Compendium, IEEE Date of Publication: Aug. 2011; pp. 1390-1397; IEEE Xplore.*

Kirovski et al.; Tunneled TLS for multi-factor authentication; Published in: Proceeding DRM '11 Proceedings of the 11th annual ACM workshop on Digital rights management; 2011; pp. 31-40; ACM Digital Library.*

* cited by examiner

*Primary Examiner* — Bradley Holder
(74) *Attorney, Agent, or Firm* — Jordan IP Law, LLC

(57) ABSTRACT

Systems and methods may implement a multi-factor authentication process utilizing, among other things, a value known by a user and an item in the user's possession. In one example, the method may include authenticating a user via a first method utilizing input received from the user, authenticating the user via a second method utilizing a device associated with the user, and authenticating the user via a third method utilizing a security token.

21 Claims, 3 Drawing Sheets

MULTI-FACTOR AUTHENTICATION PROCESS

BACKGROUND

1. Technical Field

Embodiments generally relate to authentication processes. More particularly, embodiments relate to implementing a multi-factor authentication process utilizing, among other things, a value known by a user and an item in the user's possession.

2. Discussion

In some instances, an authentication process may allow a user to gain access to a user device by utilizing a value known by a user (e.g., a password). In other instances, the user device may utilize an integrated security component (e.g., a smartcard, a one-time password token) to prevent unauthorized access. In either case, the user device may be vulnerable to an insider attack by a rogue user impersonating a proper user.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
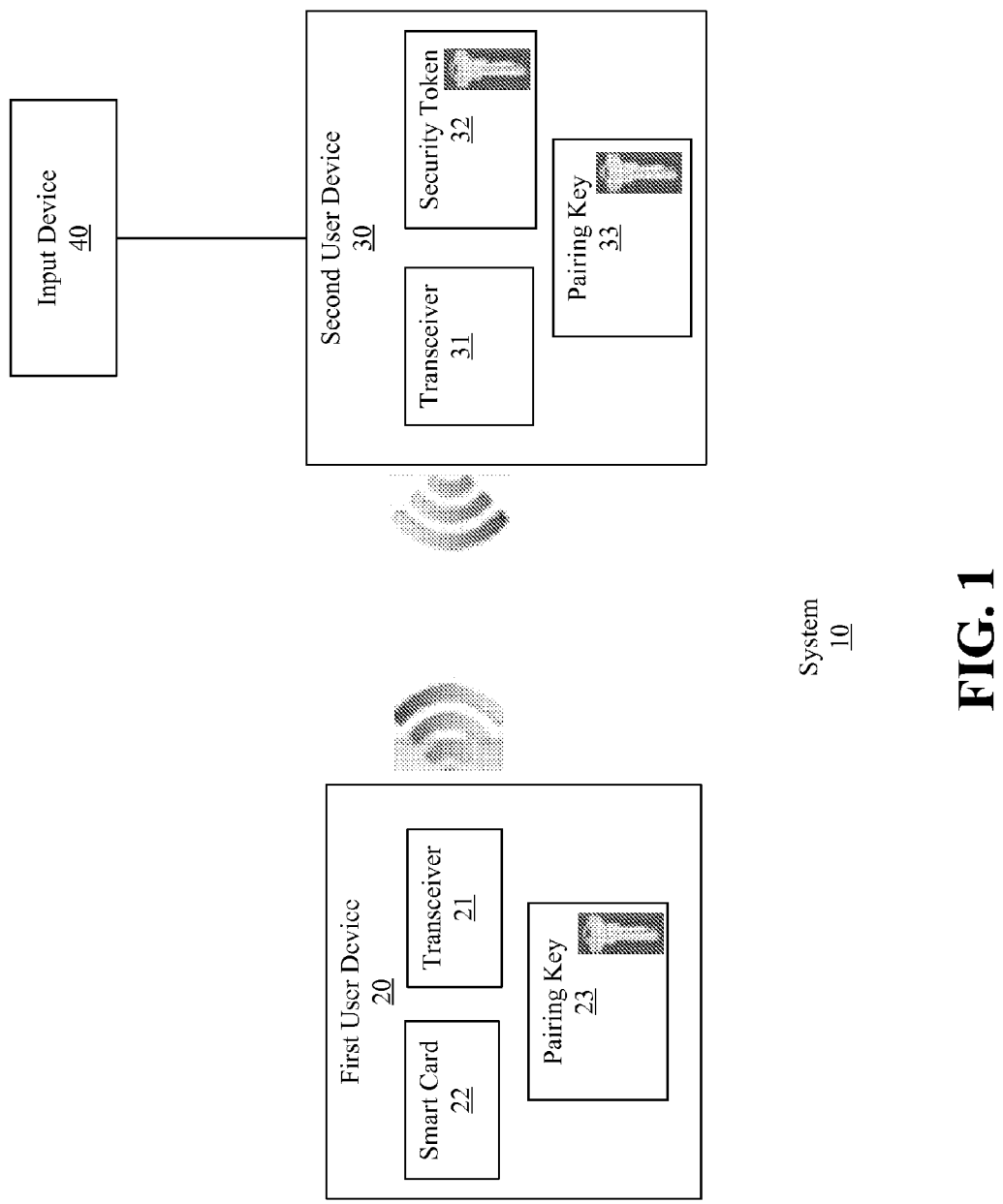
FIG. 1 is a block diagram of an example of a first system implementing a multi-factor authentication process according to an embodiment.

FIG. 1 is a block diagram of an example of a first system implementing a multi-factor authentication process. FIG. 1 illustrates a system 10 including a first user device 20, a second user device 30, and a user input device 40.

In this example, the first user device 20 may be may be any programmable machine that may carry out a sequence of logical operations. Examples of the first user device 20 may include a laptop, desktop, personal digital assistant (PDA), media player, a mobile Internet device (MID), any smart device such as a smart phone, smart tablet, or the like. In this example, the first user device 20 may be a smart phone. The first user device 20 may include a transceiver 21, a smart card 22, and a pairing key 23.

The transceiver 21 may be configured to communicate wirelessly with other devices, such as the second user device 30. In this example, the transceiver 21 may enable the first user device 20 to communicate via near-field communication (NFC) protocol. The transceiver 21 may also be configured to communicate via Bluetooth (e.g., IEEE 802.15.1-2005, Wireless Personal Area Networks), Zigbee (IEEE 802.15.4), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The smart card 22 may be a electronically-enabled card including an embedded circuit. As will discussed in greater detail, the first user device 20 may utilize the smart card 22 to communicate with another device (e.g., the second user device 30) to indicate a user's presence in a multi-factor authentication process.

The pairing key 23 may be used to verify an identity of the first user device 20 to a second device. In this example, the pairing key 23 may be a part of a pairing process previously conducted with the second user device 30. As will be discussed in greater detail, the first user device 20 may utilize the pairing key 23 to identify itself to a second device, such as the second user device 30.

The second user device 30 may be any programmable machine that may carry out a sequence of logical operations. Examples of the second user device 30 may include a laptop, desktop, PDA, media player, MID, any smart device such as a smart phone, smart tablet, smart TV, or the like. In this example, the second user device 30 may be a notebook computer. The second user device 30 may include a transceiver 31, an authentication token 32, and a pairing key 33.

The transceiver 31 may be configured to communicate wirelessly with other devices, such as the first user device 20. In this example, the transceiver 31 may enable the second user device 30 to communicate via near-field communication (NFC) protocol. The transceiver 31 may also be configured to communicate via Bluetooth (e.g., IEEE 802.15.1-2005, Wireless Personal Area Networks), Zigbee (IEEE 802.15.4), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The security token 32 may be a token used to indicate that a user has been authenticated, and that resources of the system 10 may be unlocked. In this example, the security token 32 may based on a pre-existing relationship of the first user device 20 and the second user device 30, and may be utilized to authenticate the identity of the user of the first user device 20 to third parties (e.g., a remote website operated by a third party). Examples of the security token 32 may include a platform embedded asymmetrical token (PEAT) key or a one-time password (OTP).

The pairing key 33 may be used to verify an identity of another device, such as the first user device 20. In this example, the pairing key 33 may correspond to the pairing key 23 of the first user device 20, and may be a result of a pairing process previously conducted with the first user device 20.

The user input device 40 may be a device configured to receive input information from a user. For example, a user using the first user device 20 may input information (e.g., a security code) utilizing the user input device 40 as part of an authentication process. The user input device 40 may transmit this information to the second user device 30. In this example, the user input device 40 may be a computer keyboard.

As will be discussed in greater detail, the system 10 may be configured to implement a multi-factor authentication process to authenticate a user utilizing the first user device 20. So, for example, initially, the user may utilize the user input device 40 to input a security code. The user input device 40 may transmit the security code to the second user device 30. This second user device 30 may use the security code to verify the response and authenticate the user. This may represent a first factor of authentication.

Next, the second user device 30 may issue a challenge to confirm the identity of the first user device 20 (and by extension, the user). In this example, the second user device 30 may issue challenge to the smart card 22 to identify itself. The second user device 30 may transmit an authentication communication (e.g., a hash function) to the smart card 22, requesting that the first user device 20 sign the communication using the pairing key 23. Upon receiving a response from the first user device 20, the second user device 30 may utilize the second pairing key 33 to verify the response and authenticate the user. This may represent a second factor of authentication.

Furthermore, the second user device 30 may implement a third factor of authentication. That is, upon receiving authentication of the first two factors, the second user device 30 may associate the security token 32 with the user, and then utilize the security token 32 to authenticate the user. In particular, the second user device 30 may use the pairing key 33 to authenticate the first user device 20. In addition, the second user device 30 may use the security token 32 to authenticate to, for example, a host operating system (OS) or a web service.

Figure 2:
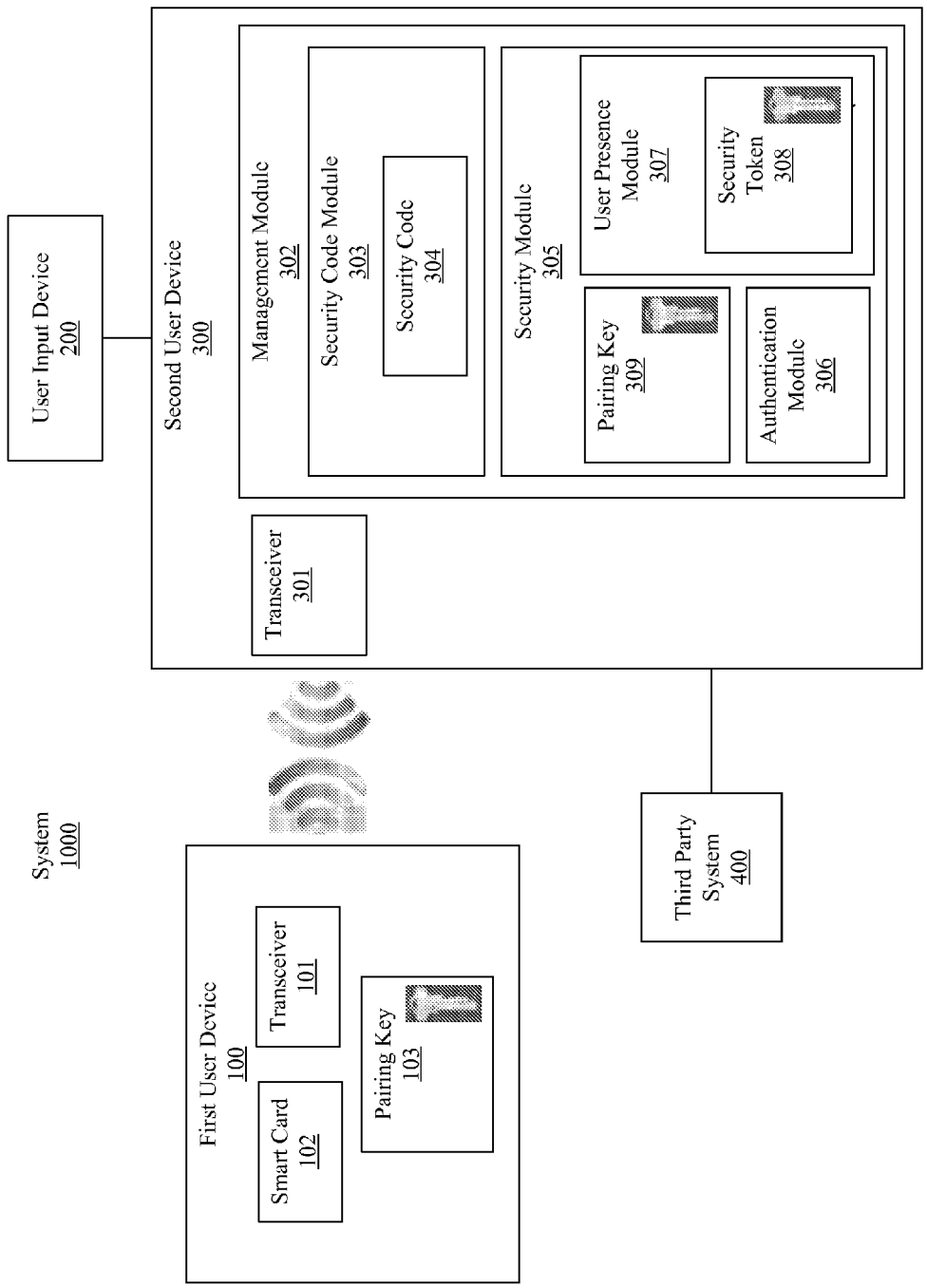
FIG. 2 is a block diagram of an example of a second system implementing a multi-factor authentication process according to an embodiment.

FIG. 2 is a block diagram of an example of a second system implementing a multi-factor authentication process. The system 1000 may include a first user device 100, a user input device 200, a second user device 300, and a third party system 400.

The first user device 100 may be may be any programmable machine that may carry out a sequence of logical operations. In this example, the first user device 100 may be a smart phone. The first user device 100 may include a transceiver 101, a smart card 102, and a pairing key 103.

The transceiver 101 may be configured to communicate wirelessly with other devices, such as the second user device 300. In this example, the transceiver 101 may enable the first user device to communicate via near-field communication (NFC) protocol. The smart card 102 may be a card including an embedded circuit. The first user device 100 may utilize the smart card 102 to communicate with another device (e.g., the second user device 30) via, for example, the NFC protocol. The pairing key 103 may be used to verify an identity of the first user device 100 to another device (e.g., the second user device 300). The pairing key 103 may be a result of a paring process previously conducted with the second user device 300.

The user input device 200 may be a device configured to receive input information from a user, and deliver the input information to the second user device 300. In this example, the user input device 200 may be a computer keyboard. The user input device 200 may capture input from a user. For example, the user input device 200 may capture a security code (e.g., a password or a pin number) from the user.

The second user device 300 may also be any programmable machine that may carry out a sequence of logical operations. Examples of the second user device 30 may include a notebook computer, a desktop computer, PDA, media player, MID, any smart device such as a smart phone, smart tablet, smart TV, or the like. In this example, the second user device 300 may be a notebook computer. The second user device 300 may include a transceiver 301 and a management module 302.

The transceiver 301 may be configured to communicate wirelessly with other devices, such as the first user device 100. In this example, the transceiver 301 may enable the first user device to communicate via near-field communication (NFC) protocol.

The management module 302 may be configured to, among other things, implement a multi-factor authentication process. For example, the management module may be a converged security and manageability engine (CSME). The management module 302 may include a security code module 303 and a security module 305.

The security code module 303 may be configured to receive a security code from a user (e.g., via the user input device 200). The security code module 303 may transmit the security code received from the user and a security code 304 to the security module 305 to determine whether the user should be authenticated (i.e., allowed access). The security code 304 may known to the security code module 303 as a valid security code.

The security module 305 may be configured to, among other things, receive information from the security code module 303, analyze the information to determine if the user has submitted a valid security code, determine an appropriate level of access for the user, and implement the appropriate level of access. The security module 305 may include an authentication module 306, a user presence module 307, and a pairing key 309.

The authentication module 306 may be configured to, among other things, authenticate a user utilizing a multi-factor authentication process. This may include receiving information from a user, and analyzing the information to determine if the user should be authenticated.

So, for example, the authentication module 306 may be configured to compare the security code received from the user with the security code 304 to determine whether the user should be authenticated. This may represent a first factor of a multi-factor authentication process.

In addition, the authentication module 306 may be configured to implement a second factor of a multi-factor authentication process as well. In particular, the authentication module 306 may transmit a challenge in the form of an authentication inquiry (e.g., a hash function) to the smart card 102 of the first user device 20. The communication may require the smart card 102 to sign the communication using the pairing key 103.

Upon receiving the signed response communication from the first user device 100, the authentication module 306 may utilize the pairing key 309 to determine whether the first user device 100 may be authenticated. Upon authenticating the first user device 100, the authentication module 306 may determine an appropriate level of access to be granted to the user device 100.

The user presence module 307 may be configured to, among other things, receive an indication that a user device has been authenticated (e.g., from the authentication module 306), and implement the level of access provided by the authentication module 306. As will be discussed in greater detail, implementing the level of access provided by the authentication module 306 may include providing access to the second user device 300, continuously monitoring a presence of the first user device 100 to allow further access, and notifying remote sites or operating systems, such as the third party system 400, that the user has been authenticated and should be granted access.

With regard to the continuous monitoring of the presence of the first user device 100, the user presence module 307 may determine if the user remains within a required range. In this example, the required range may be the distance that the smart card 102 of the first user device 100 may required to communicate with the second user device via the NFC protocol. If the presence of the first user device 100 is detected, the access may be periodically refreshed. If the first user device 100 is no longer detected, however, the user presence module 307 may generate a notification to other components of the system 1000 that the presence of the first user device is no longer available as an authentication factor.

Furthermore, upon receiving an indication that the first user device 100 may be authenticated, the user presence module 307 may notify remote sites or operating systems, such as the third party system 400, that the user should be granted access. The user presence module 307 may do by associating a security token 308 with the user. In one example, the security token 308 may be a platform embedded asymmetrical token (PEAT) key. In another example, the security token 308 may be a one-time password (OTP). For example, the security token 308 may be utilized as part of an attestation process between the management module 302 and the third party. In one example, the attestation process may identify the management module 302 to the third party, indicate to the third party that the management module 302 (i.e., and all of its components) has facilitated each of the factors of a multi-factor authentication process, and indicate that the multi-factor authentication process took place in a secure environment.

Figure 3:
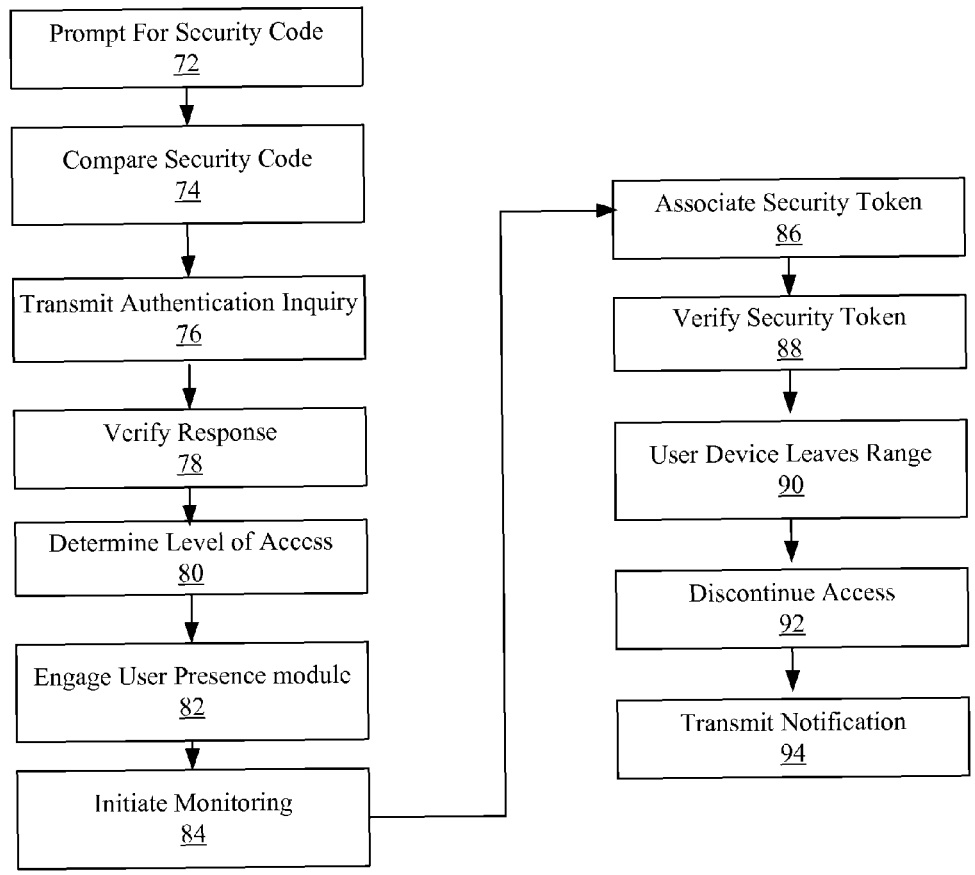
FIG. 3 is a flowchart of an example of a method of implementing a multi-factor authentication process according to an embodiment.

FIG. 3 is a flowchart of an example of a method of implementing a multi-factor authentication process according to an embodiment. In this example, a user may utilize a first user device, such as the first user device 100 (FIG. 2) and a user input device, such as the user input device 200 (FIG. 2), to provide information that may be used to authenticate the user. A second user device, such as the second user device 300 (FIG. 2), may utilize the received information to authenticate the user, and inform a third party system, such as the third party system 400 (FIG. 2), that the user has been authenticated.

The method might be implemented as a set of logic instructions stored in a machine- or computer-readable storage medium such as, for example, random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as the "C" programming language or similar programming languages.

At processing block 72, a security code module, such as the security code module 303 (FIG. 2), may prompt the user to enter a security code that may be used to determine whether to grant the user access. Upon receiving the security code entered by the user, the security code module may transmit the security code received from the user along with a verified security code, such as the security code 304 (FIG. 2), to a security module, such as the security module 305 (FIG. 2).

At processing block 74, an authentication module, such as the authentication module 306 (FIG. 2), of the security module may receive the security code received from the user and the verified security code. The authentication module may compare the two, and in this example, find that they may match. This may satisfy a first factor of authentication in the multi-factor authentication process.

At processing block 76, the authentication module may transmit an authentication inquiry (e.g., a hash function) to the first user device requesting that the first user device sign and return the communication using a first pairing key, such as the pairing key 103 (FIG. 2). At processing block 78, the authentication module may receive and verify the first user device's response. The authentication module may verify the response by utilizing a second pairing key, such as the pairing key 309 (FIG. 2). The verification of the pairing key may represent a second factor in an authentication process.

At processing block 80, the authentication module may determine a level of access that is appropriate for the user utilizing the first user device. The authentication module may inform a user presence module, such as the user presence module 307 (FIG. 2), that the first user device has been authenticated at processing block 82. At processing block 84, the user presence module may initiate monitoring of a presence of the first user device. In this example, the user presence module may determine if the first user device remains within a required range required to communicate via NFC protocol.

The user presence module may notify third party subscribers, such as a third party operating the third party system 400 (FIG. 2), that the first user device has been authenticated at processing block 86. The user presence module may do so by associating a security token, such as the security token 308 (FIG. 2), with the user. In this example, the security token may be a PEAT key. Upon associating the security token with the user, the security module may utilize the security token to authenticate the user to a third party subscriber. This may represent a third factor in an authentication process. At processing block 88, upon receiving the security token, the third party subscriber may verify the security token and authenticate the first user device.

The first user device may leave the required range (i.e., the user's presence may no longer be detected) at processing block 90. At processing block 92, after a predetermined period of not detecting the presence of the first user device, the user presence module may discontinue the access provided to the user (and, by extension, the first user device). At processing block 94, the user presence module may transmit a notification (e.g., to the third party system) that the presence of the first user device is no longer available as an authentication factor.

Embodiments may therefore include a system having a user input device, a first user device including a first transceiver and a first pairing key and a second user device. The second user device may include a second transceiver and a security code module having first logic to receive a security code provided by a user via the user input device and second logic to store a verified security code associated with the user. The system may also include an authentication module to having third logic to compare the security code provided by the user and the verified security code to authenticate the user via a first method, fourth logic to issue a challenge communication to the first user device, and verify a response to the challenge communication using a second pairing key obtained from a pairing process with the first user device to authenticate the user via a second method, and fifth logic to determine a level of access for the user. Additionally, the system may include a user presence module to associate a security token with the user to authenticate the user via a third method.

Embodiments may also include at least one computer readable storage medium comprising a set of instructions which, if executed by a processor, cause a computer to authenticate a user via a first method utilizing input received from the user. Additionally, the instructions may cause a computer to authenticate the user via a second method utilizing a device associated with the user and authenticate the user via a third method utilizing a security token.

Embodiments may also include an apparatus having a management module with first logic to authenticate a user via a first method utilizing input received from the user and second logic to authenticate the user via a second method utilizing a device associated with the user. The management module may also include third logic to authenticate the user via a third method utilizing a security token.

Embodiments may also include a method that involves authenticating a user via a first method utilizing input received from the user and authenticating the user via a second method utilizing a device associated with the user. The method may also provide for authenticating the user via a third method utilizing a security token.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a user input device;
a first user device including a first transceiver and a first pairing key; and
a second user device including:
a second transceiver, wherein at least one of said first transceiver and said second transceiver comprises hardware;
a security code module including,
first logic to receive a security code provided by a user via the user input device,
second logic to store a verified security code associated with the user,
an authentication module including,
third logic to compare the security code provided by the user and the verified security code to authenticate the user via a first method,
fourth logic to issue a challenge communication to the first user device, and verify a response to the challenge communication using a second pairing key obtained from a pairing process with the first user device to authenticate the user via a second method, and
fifth logic to determine a level of access for the user;
a user presence module comprising hardware and/or software to associate a security token with the user to authenticate the user via a third method; a security module comprising hardware and/or software, wherein the security module is to authenticate the user to a third party via an attestation process utilizing the security token, and wherein the attestation process is to verify authentication of the user via the first method, the second method, and the third method.

2. The system of claim 1, wherein the user presence module is to, monitor the user's presence, and
discontinue a level of access for the user if the user's presence is no longer detected.

3. The system of claim 1, wherein the user presence module is included in the security module.

4. The system of claim 3, wherein the attestation process is to verify the authentication of the user in a secure environment.

5. At least one non-transitory computer readable storage medium comprising a set of instructions which, if executed by a processor, cause a computer to:
authenticate a user via a first method utilizing an input of a security code received from the user that is compared to a verified security code;
authenticate the user via a second method in which the set of instructions causes a computer to issue a challenge communication to a device associated with the user and verify a response to the challenge communication from the device associated with the user to authenticate the user by comparing a first pairing key associated with the device associated with the user to a second pairing key associated with the computer, and
authenticate the user to a third party via a third method utilizing a security token that is caused to be associated with the user, wherein the first method, the second method, and the third method together authenticate the user.

6. The at least one computer readable storage medium of claim 5, wherein, if executed, the set of instructions cause a computer to monitor the user's presence.

7. The at least one computer readable storage medium of claim 5, wherein, if executed, the set of instructions cause a computer to determine a level of access for the user.

8. The at least one computer readable storage medium of claim 5, wherein, if executed, the set of instructions cause a computer to conduct an attestation process utilizing the security token to authenticate the user to a third party.

9. An apparatus comprising:
a management module including,
first logic to authenticate a user via a first method utilizing an input of a security code received from the user that is compared to a verified security code,
second logic to authenticate the user via a second method utilizing a device associated with the user, wherein the device has a first pairing key,
third logic to authenticate the user via a third method utilizing a security token to authenticate the user to a network,
wherein the management module is to include a security module comprising hardware and/or software to authenticate the user via the first method, the second method and the third method, and wherein the security module is to include an authentication module comprising hardware and/or software that is to issue a challenge communication to the device associated with the user, and verify a response to the challenge communication from the device associated with the user by comparing the first pairing key to a second pairing key that is contained within the management module in order to authenticate the user via the second method, and
wherein the management module is implemented at least partly in fixed-functionality logic hardware, and wherein an attestation process is to verify that the management module has authenticated the user in a secure environment via the first method, the second method, and the third method.

10. The apparatus of claim 9, wherein the management module is to include a security code module to receive a security code provided by the user, and to store a verified security code associated with the user.

11. The apparatus of claim 9, wherein the authentication module is to compare a security code provided by the user and a verified security code to authenticate the user via the first method.

12. The apparatus of claim 9, wherein the authentication module that verifies the response to the challenge communication uses a pairing key obtained from a pairing process with the device associated with the user.

13. The apparatus of claim 9, wherein the authentication module is to determine a level of access for the user.

14. The apparatus of claim 9, wherein the security module is to further include a user presence module comprising hardware and/or software to monitor the user's presence.

15. The apparatus of claim 14, wherein the user presence module is to discontinue a level of access for the user if the user's presence is no longer detected.

16. The apparatus of claim 14, wherein the user presence module is to associate the security token with the user to authenticate the user via the third method.

17. The apparatus of claim 14, wherein the user presence module is to authenticate the user to a third party via an attestation process utilizing the security token.

18. A method comprising:
   authenticating a user via a first method utilizing an input of a security code received from the user that is compared to a verified security code;
   authenticating the user via a second method utilizing a first user device associated with the user, wherein the first user device has a first pairing key; and
   authenticating the user via a third method utilizing a security token, wherein authentication of the user via the third method is to a third party via an attestation process utilizing the security token;
   wherein authenticating the user via the second method includes issuing a challenge communication to the first user device associated with the user and verifying a response to the challenge communication from the first user device associated with the user by comparing the first pairing key to a second pairing key that is contained within a second user device wherein at least one of said devices comprises hardware, and wherein the attestation process is to verify that the user has been authenticated in a secure environment via the first method, the second method, and the third method.

19. The method of claim 18, further including monitoring the user's presence.

20. The method of claim 18, further including determining a level of access for the user.

21. The method of claim 18, wherein authenticating the user via the third method includes associating the security token with the user.

* * * * *